United States Patent [19]

Schneider et al.

[11] Patent Number: 5,405,881
[45] Date of Patent: Apr. 11, 1995

[54] ESTER CURED NO-BAKE FOUNDRY BINDER SYSTEMS

[75] Inventors: James T. Schneider, Dublin; Gary R. Hysell, Columbus, both of Ohio

[73] Assignee: Ashland Oil, Inc., Columbus, Ohio

[21] Appl. No.: 260,620

[22] Filed: Jun. 16, 1994

Related U.S. Application Data

[63] Continuation of Ser. No. 977,964, Nov. 18, 1992, abandoned.

[51] Int. Cl.⁶ .................... B22C 1/22; C08K 3/36; C08L 61/10; C08L 63/02
[52] U.S. Cl. .................... 523/145; 523/146; 523/424
[58] Field of Search .................... 523/145, 146, 424

[56] References Cited

U.S. PATENT DOCUMENTS

| | | | |
|---|---|---|---|
| 3,404,118 | 10/1968 | Guyer | 523/145 |
| 4,508,765 | 4/1985 | Ring | 523/424 |
| 4,596,840 | 6/1986 | Hesse | 523/424 |
| 4,732,920 | 3/1988 | Graham | 523/146 |
| 4,761,441 | 8/1988 | Woodson | 523/144 |
| 4,980,394 | 12/1990 | Lemon | 523/146 |
| 4,988,745 | 1/1991 | Iyer | 524/541 |
| 5,082,876 | 1/1992 | Iyer et al. | 523/145 |

Primary Examiner—John C. Bleutge
Assistant Examiner—D. R. Wilson
Attorney, Agent, or Firm—David L. Hedden

[57] ABSTRACT

The invention relates to an ester cured no-bake foundry binder system preferably comprising as separate components (a) an aqueous basic solution of a phenolic resole resin; (b) a hardener comprising (i) an epoxy resin, and (ii) a liquid ester.

7 Claims, No Drawings

ESTER CURED NO-BAKE FOUNDRY BINDER SYSTEMS

This application is a continuation of application Ser. No. 07/977,964, filed Nov. 18, 1992, now abandoned.

TECHNICAL FIELD

The invention relates to an ester cured no-bake foundry binder system preferably comprising as separate components: (a) an aqueous basic solution of a phenolic resole resin; and (b) a hardener comprising (i) an epoxy resin, and (ii) a liquid ester. Alternatively, the epoxy resin can used as a separate component.

BACKGROUND OF THE INVENTION

It is known to mix liquid esters and aqueous basic solutions of phenolic resins with sand to make foundry mixes which are made into foundry shapes by the no-bake process. Although these binders have some advantages from an environmental standpoint, the physical properties of the foundry shapes made with these binders are generally inferior to those made from polyurethane-forming binders. In particular, the tensile strengths of foundry shapes made with the liquid esters and aqueous basic solutions of phenolic resole resins are lower. Consequently, there is an interest in finding additives or otherwise modifying the formulations of these binders to improve the tensile strengths of the foundry shapes made with these binders.

SUMMARY OF THE INVENTION

The subject invention relates to an ester cured no-bake foundry binder comprising as separate components:
(a) an aqueous basic solution of a phenolic resole resin;
(b) a hardener comprising
 (i) an epoxy resin, and
 (ii) a liquid ester.
Alternatively, the epoxy resin can used as a separate component.

The subject invention also relates to (a) foundry mixes prepared with the foundry binder system, (b) a process for preparing workable foundry shapes, (c) the shapes prepared with the foundry mixes, (d) a process for preparing metal castings with the workable foundry shapes, and (e) the castings prepared with the workable foundry shapes.

Foundry shapes made with this foundry binder system show improved tensile strengths when compared to foundry shapes made with foundry binders which do not contain an epoxy resin. Hardener component (b), which is a solution, is stable and does not form a skin on its surface when exposed to air. This reduces the chance that the equipment used to pump components (a) and (b) will get plugged.

BEST MODE AND OTHER MODES

Definitions

For purposes of this disclosure, a "foundry shape" is a shape used in pouring metal castings and is made by shaping a mixture of a foundry aggregate and a binder. Such shapes include cores, molds, and assemblies of cores and molds.

The "no-bake process" refers to a process for making foundry shapes wherein a foundry mix is formed by mixing an aggregate and a binder which includes a liquid curing agent. The foundry mix is then mechanically forced into a pattern to form a foundry shape. The no-bake process is particularly useful for forming large foundry shapes such as those weighing from about 0.1 to about 1000 kilograms, typically from about 0.5 to about 500 kilograms which require significant worktime and striptime.

Resin Component Of Binder System

The aqueous basic solutions of phenolic resole resins used in the subject binder compositions are prepared by methods well known in the foundry art. The specific method for preparing the aqueous solutions of phenolic resole resins is not believed to be critical to the effective practice of this invention. Those skilled in this art will know what conditions to select depending upon the specific application.

The general procedure involves reacting an excess of an aldehyde with a phenolic compound in the presence of a basic catalyst at temperatures of about 40° C. to about 120° C., typically from about 50° C. to about 90° C., to prepare a phenolic resole resin. Generally the reaction will also be carried out in the presence of water. Preferably, the resulting phenolic resole resin is diluted with a base and/or water so that an aqueous basic solution of the phenolic resole resin results having the following characteristics:

1. a viscosity of less than about 850 centipoise, preferably less than about 450 centipoise at 25° C. as measured with a Brookfield viscometer, spindle number 3 at number 12 setting;
2. a solids content of 35 percent by weight to 75 percent by weight, preferably 50 percent by weight to 60 percent by weight, based upon the total weight of the aqueous basic solution, as measured by a weight loss method by diluting 0.5 gram of aqueous resole solution with one milliliter of methanol and then heating on a hotplate at 150° C. for 15 minutes; and
3. an equivalent ratio of base to phenol of from 0.2:1.0 to 1.1:1.0, preferably from 0.3:1.0 to 0.95:1.0.

It has been found that aqueous basic solutions having viscosities outside the cited range are difficult to use in foundry applications. Aqueous basic solutions with a solids content below the cited range will not sufficiently coat the aggregate while those having a solids content above the cited range will not be sufficiently flowable in the molding equipment. The equivalent ratio specified for the base relates to the need for having solutions which have adequate shelf stability.

Although these ranges have been specified, it should be pointed out that it is not claimed that these aqueous basic solutions are novel products, or that the ranges are critical. The ranges are set forth to provide guidelines for those who want to make and use the invention. Obviously, the invention will usually be practiced more effectively in the preferred ranges specified. With this in mind, more specific procedures will be set forth for preparing phenolic resole resins.

The phenolic compounds used to prepare the phenolic resole resins can be represented by the following structural formula:

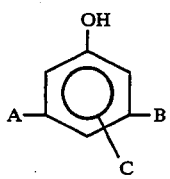

wherein A, B, and C are hydrogen, or hydrocarbon radicals or halogen.

The aldehyde used in preparing the phenolic resole resin may also vary widely. Suitable aldehydes include aldehydes such as formaldehyde, acetaldehyde, propionaldehyde, furfuraldehyde, and benzaldehyde. In general, the aldehydes used have the formula RCHO, where R is a hydrogen or a hydrocarbon radical of 1 to 8 carbon atoms. The most preferred aldehyde is formaldehyde.

The basic catalysts used in preparing the phenolic resole resin include basic catalysts such as alkali or alkaline earth hydroxides, and organic amines. The amount of catalyst used will vary depending upon the specific purposes. Those skilled in the art are familiar with the levels needed.

It is possible to add compounds such as lignin and urea when preparing the phenol formaldehyde resole resins as long as the amount is such that it will not detract from achieving the desired properties of the aqueous basic solutions. Urea is added as a scavenger to react with unreacted formaldehyde and decrease the odor caused by it. Although urea may be added for these purposes, it is believed that lower long term tensile strengths may result by the addition of urea. Therefore, if long term tensile strengths are of paramount importance, the urea should be avoided.

The phenolic resole resins used in the practice of this invention are generally made from phenol and formaldehyde at a mole ratio of formaldehyde to phenol in the range of from about 1.1:1.0 to about 3.0:1.0. The most preferred mole ratio of formaldehyde to phenol is a mole ratio in the range of from about 1.4:1.0 to about 2.2:1.0.

As was mentioned previously, the phenolic resole resin is either formed in the aqueous basic solution, or it is diluted with an aqueous basic solution. The base used in the aqueous basic solution is usually a dilute solution of an alkali or alkaline earth metal hydroxide, such as potassium hydroxide, sodium hydroxide, calcium hydroxide, or barium hydroxide, preferably potassium hydroxide or mixtures of sodium hydroxide and potassium hydroxide, in water such that the solution typically contains from about 50 to about 55 percent water by weight.

It should again be mentioned that the aqueous basic solutions described herein are not novel products, nor is their method of preparation. The parameters set forth pertaining to their preparations are merely guidelines for those who want to make the aqueous basic solutions. There may be other effective ways to make them which are not described herein.

Epoxy Resins

The novel aspect of this invention relates to the use of epoxy resins in these ester cured no-bake alkaline phenolic resole binder systems. For purposes of this disclosure, "epoxy resin" is defined as a thermosetting resin which contains more than one reactive epoxide group per molecule. Such resins have either a mixed aliphatic-aromatic or exclusively non-aromatic (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy-aromatic)alkane with a halogen-substituted aliphatic epoxide in the presence of a base such as, for example, sodium hydroxide or potassium hydroxide. Examples of the halogen-substituted aliphatic epoxides include epichlorohydrin, 4-chloro-1,2-epoxybutane, 5-bromo-1,2-epoxypentane, 6-chloro-1,3-epoxyhexane and the like. In general, it is preferred to use a chloride substitute terminal denoting that the epoxide group is on the end of the alkyl chain.

The most widely used epoxy resins are diglycidyl ethers of bisphenol A. These are made by reaction of epichlorohydrin with bisphenol A in the presence of an alkaline catalyst. By controlling the operating conditions and varying the ratio epichlorohydrin to bisphenol A, products of different molecular weight can be made. Other epoxy resins include (a) the diglycidyl ethers of other bisphenol compounds such as bisphenol B, F, G, and H, (b) epoxy resins produced by reacting a novolac resin with a halogen-substituted aliphatic epoxide such as epichlorohydrin, 4-chloro-1,2-epoxybutane, 5-bromo-1,2-epoxypentane, 6-chloro-1,3-epoxyhexane and the like, (c) epoxidized polybutadiene resins, and (d) epoxidized drying oils.

Particularly preferred are epoxy resins with a weight per epoxy group of 175 to 200. Although the viscosities of the epoxy resins are high, usually greater than 5,000 cps at 25° C., the epoxy resin is reduced to a workable level when it is mixed with the ester component and used in a two component binder system. If the epoxy resin is used as separate component in a three part binder system, it must be diluted with methanol or some other suitable solvent to reduce the viscosity to a workable level.

Liquid Esters Of Hardener Component

The liquid esters used in the hardener component of the foundry binder system are well known in the art. Those which are preferred include lactones, organic carbonates, carboxylic acid esters, and mixtures thereof.

Generally, low molecular weight lactones are suitable, such as gamma-butyrolactone, valerolactone, caprolactone, beta-propiolactone, beta-butyrolactone, isopentylactone and delta-pentylactone. Carboxylic acid esters which are suitable include those of short and medium chain length, i.e., about $C_1$ to $C_{10}$ carboxylic acids. Specific carboxylic acid esters include, but are not limited to, n-butyl acetate, ethylene glycol diacetate, triacetin (glycerol triacetate), dimethyl glutarate, and dimethyl adipate.

Suitable organic carbonates include propylene carbonate, 1,2-butanediol carbonate, 1,3-butanediol carbonate, 1,2-pentanediol carbonate and 1,3-pentanediol carbonate.

Foundry Aggregate

Any foundry aggregate can be used to prepare the foundry mix. Generally the aggregate will be sand which contains at least 70 percent by weight silica. Other suitable sand includes zircon, olivine, alumina-silicate sand, chromite sand, and the like. Generally, the particle size of the sand is such that at least 80 percent by weight of the sand has an average particle size between 50 and 150 mesh (Tyler Screen Mesh). Mixtures of sand and reclaimed sand can used.

Optional Constituents

Other optional constituents can be used in the binder system. A particularly useful additive to the binder compositions in certain types of sand is a silane such as those having the general formula:

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. Such silanes, when employed in concentrations of 0.1% to 2%, based on the phenolic binder and hardener, improve the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

Preparing Foundry Mixes

A foundry mix is typically prepared by mixing the hardener component (b) with the aggregate and then mixing component (a) with the aggregate containing the hardener. Alternatively, the epoxy resin of the hardener component can be added as a separate component.

If the epoxy resin is added as a separate component, it can be added directly to the aggregate before the ester and phenolic resin component. In this situation, the phenolic resin component is added to the aggregate after the ester is mixed with the sand containing the epoxy resin.

The epoxy resin can also be added as a separate component to the aggregate after the ester is first mixed with the sand. In this situation, the phenolic resin is then mixed with the aggregate containing the epoxy resin and ester.

Preparing Foundry Shapes By The No-Bake Process

Preferably, the foundry mix is prepared by first mixing the hardener component (b) with the aggregate before mixing the resin component (a) with aggregate containing the hardener. Foundry shapes are prepared with the foundry mixes by introducing them into a pattern according to techniques well known in the art to form a foundry shape, i.e. core or mold.

The foundry shape is left in the pattern until it is workable. A workable foundry shape is one which can be handled without breaking when it is removed from the pattern. Curing with the liquid ester is carried out according to techniques well known in the art.

Metal castings are produced from the workable foundry shapes in a conventional manner. Essentially, molten metal (ferrous or non-ferrous) is poured into and around the workable foundry shape and allowed to harden. The workable foundry shape is then removed.

Amounts Of Components Used

In making foundry shapes, the aggregate constitutes the major (typically more than 80 percent by weight of the total weight of the foundry shape) constituent and the binder system constitutes a relatively minor amount. The amount of binder system, which includes both components (a) and (b), is generally no greater than about ten percent by weight and frequently within the range of about 0.5 to about 7 percent by weight based upon the weight of the aggregate. Most often, the binder content ranges from 0.6 to about 5.0 percent by weight based upon the weight of the aggregate in most foundry shapes.

In general the weight ratio of component (a) to component (b) of the binder system is from about 100:1 to about 1:1, preferably from about 10:1 to 1:1, most preferably from about 10:1 about 2:1 weight percent.

The epoxy resins are used in amount effective to improve the tensile strengths of the foundry shapes prepared with the foundry binder systems. Generally, the weight ratio of the epoxy resin to liquid ester in the hardener component is from about 1:10 to about 10:1 based upon the total weight of the hardener, preferably 1:10 to 5:10, and most preferably from about 1:4 to about 1:2 weight percent.

EXAMPLES

In Examples 1-3, an aqueous basic solution of a urea modified phenolic resole resin (hereinafter referred to as the resin component) was used. The resin is sold under the trademark CHEM-REZ®400 binder and is commercially available from Ashland Chemical, Inc. It is not believed that the use of this particular resin is critical to the performance of the subject binder systems, and that other commercially available alkaline phenolic resole resins used in no-bake binder systems will work effectively.

CHEM-REZ 400 binder is a urea modified phenol-formaldehyde base catalyzed resole condensate prepared by reacting phenol, paraformaldehyde, and water in the presence of dilute alkali hydroxide bases (45% to 50% in water) at elevated temperatures such that the molar ratio of formaldehyde to phenol is about 1.9:1.0, the molar ratio of water to phenol is about 6.77:1.0, the molar ratio of sodium hydroxide to phenol is about 0.07:1.0, the molar ratio of potassium hydroxide to phenol is from about 0.73:1.0, the molar ratio of urea to phenol is about 0.11:1, and the molar ratio of gamma amino propyl triethoxy silane to phenol is about 0.00375:1.0.

The resin component has a solids content of about 53 percent and a viscosity of about 115 centipoise at 25° C.

The examples which follow will illustrate specific embodiments of the invention. They are not intended to imply that the invention is limited to these embodiments.

In the Examples the following abbreviations will be used:

EPOXY RESIN A—is the reaction product of Bisphenol F and epichlorohydrin having an average molecular weight of about 340 and is sold under the tradename EPOXY 8230 by Core Lube Industries.

EPOXY RESIN B—is the reaction product of bisphenol A and epichlorhydrin having an average molecular weight of about 380 and is sold under the tradename DOW DER 331 by Dow Chemical Company.

Foundry mixes were prepared with various two component binder systems by mixing 2.0 weight percent, based upon the weight of sand, of the binder system with Wedron 540 sand. The weight ratio of aqueous alkaline phenolic resole resin to hardener component was 3:1. The weight ratio of epoxy resin to glyceryl triacetate (ester) in the hardener was 1:4. The hardener was first mixed with the sand and then the aqueous basic solution of phenolic resole resin was mixed with the sand containing the hardener component to form the foundry mix.

The tensile strengths of foundry shapes made with the binder system were measured according to AFS standard testing procedures used for no-bake foundry binders. Essentially, a foundry mix is prepared by first mixing the sand with the aqueous basic phenolic resole resin solution. This mixture is then mixed with the hardener to form the foundry mix. The foundry mix was then forced into a standard core box (dog bone shape) and allowed to cure. Tensile strengths (in psi) of the cured samples were then measured by conventional methods.

In all of these examples, the same components and amounts (described previously) were used unless otherwise specified. Table I shows the specific epoxy resins which were used in two component binder systems. The data in Table I indicate that the addition of the epoxy resin to the hardener component results in foundry shapes with improved tensile strengths.

TABLE I (Tensile Strengths of Foundry Shapes Cured by a Two Component No-Bake Binder System)

| Formulation | | Tensile (psi) | | |
|---|---|---|---|---|
| Example | EPOXY RESIN | 1 hr | 3 hr | 24 hr |
| Control A | None | 109 | 185 | 291 |
| 1 | A | 130 | 211 | 370 |
| 2 | B | 143 | 199 | 350 |

Example 3 was carried according to the procedures for Examples 1 and 2 except the epoxy resin B, as a 50:50 weight percent dispersion in methanol, was added to the sand after the ester was mixed with the sand. Then the phenolic resin component was added. The results are set forth in Table II. Two controls were run and the results are reported in Table II.

TABLE II (Tensile Strengths of Foundry Shapes Cured by a Three Component No-Bake Binder System)

| Formulation | | Tensile (psi) | | |
|---|---|---|---|---|
| Example | EPOXY RESIN | 1 hr | 3 hr | 24 hr |
| Control B | None | 81/99 | 170/194 | 276/309 |
| 3 | B | 122 | 231 | 331 |

The results in Table II indicate that tensile strengths were improved for the foundry shapes made with the binder system where the epoxy resin was added as a third component to the sand.

Examples 4–5 were carried out in the same manner as Examples 1–2 except the phenolic resole resin was not modified with urea.

We claim:

1. A foundry mix for preparing foundry shapes by a no-bake process which comprises in admixture:
   (a) a foundry aggregate,
   (b) an aqueous basic solution of a phenolic resole resin having
      (1) a viscosity of less than about 450 centipoise at 25° C.,
      (2) a solids content of about 35 to about 75 percent by weight, said weight based upon the total weight of the basic solution, and
      (3) an equivalent ratio of base to phenol of 0.2:1.0 to 1.1:1.0, and
   (c) a hardener comprising
      (i) an epoxy resin which is thermosetting and has more than one epoxide group per molecule, and
      (ii) a liquid ester selected from the group consisting of lactones, organic carbonates, carboxylic acid esters, and mixtures thereof,
   wherein the weight ratio of the epoxy resin to ester is from 1:10 to 10:1, the weight ratio of (b) to (c) is from 10:1 to 1:1, and the weight of components (b) and (c) combined is from about 0.5 to about 7 percent by weight based upon the weight of the foundry aggregate (a).

2. The foundry mix of claim 1 wherein the epoxy resin used in the hardener is selected from the group consisting of (a) reaction products of epichlorohydrin and bisphenol A and (b) reaction products of epichlorohydrin and bisphenol F, wherein said epoxy resin has a weight per epoxy of about 175 to 200.

3. The foundry mix of claim 2 wherein the weight ratio of the epoxy resin to ester is from 1:10 to 5:10 and the weight ratio of component (a) to the hardener mixture of component (b) in the system is from 10:1 to 2:1.

4. A process for preparing a workable foundry shape by a no-bake process comprising:
   A. shaping the foundry mix of claim 1 by injecting it into a corebox or pattern mold;
   B. curing said foundry mix until a workable shape is formed.

5. A process for preparing a workable foundry shape by a no-bake process comprising:
   A. shaping the foundry mix of claim 2
      (a) a foundry aggregate,
      (b) an aqueous basic solution of a phenolic resole resin, and
      (c) a hardener comprising:
         (i) an epoxy resin; and
         (ii) a liquid ester by injecting it into a corebox or pattern mold; and
   B. curing said foundry mix until a workable shape is formed.

6. A process for preparing a workable foundry shape by a no-bake process comprising:
   A. shaping the foundry mix of claim 3 by injecting it into a corebox or pattern mold; and
   B. curing said foundry mix until a workable shape is formed.

7. A workable foundry shape prepared according to claim 6.

* * * * *